United States Patent [19]

Miller et al.

[11] Patent Number: 5,578,213

[45] Date of Patent: Nov. 26, 1996

[54] FLUID TREATMENT PROCESS

[75] Inventors: John D. Miller, Ithaca; Dana E. Gingrich; Donald H. White, Jr., both of Homer, all of N.Y.

[73] Assignee: Pall Corporation, East Hills, N.Y.

[21] Appl. No.: 405,762

[22] Filed: Mar. 16, 1995

Related U.S. Application Data

[63] Continuation of Ser. No. 295,611, Aug. 25, 1994, abandoned, which is a continuation-in-part of Ser. No. 920,973, Jul. 28, 1992, Pat. No. 5,374,356.

[51] Int. Cl.⁶ ............................................. B01D 61/58
[52] U.S. Cl. ........................... 210/641; 210/651; 210/259
[58] Field of Search ..................... 210/641, 651, 210/259, 257.2, 652, 258

[56] References Cited

U.S. PATENT DOCUMENTS

| | | |
|---|---|---|
| 3,797,662 | 3/1974 | Titus . |
| 3,879,286 | 4/1975 | Berriman . |
| 3,883,432 | 5/1975 | Hildebrand . |
| 3,997,447 | 12/1976 | Breton et al. . |
| 4,066,554 | 1/1978 | Guyer . |
| 4,071,445 | 1/1978 | Katayama et al. . |
| 4,093,552 | 6/1978 | Guyer . |
| 4,427,552 | 1/1984 | Lieberherr et al. . |
| 4,872,988 | 10/1989 | Culkin . |
| 4,900,440 | 2/1990 | Ziegler et al. . |
| 4,925,557 | 5/1990 | Ahlberg, Jr. et al. ............... 210/321.68 |
| 4,952,317 | 8/1990 | Culkin . |
| 4,956,102 | 9/1990 | Allsing . |
| 5,014,564 | 5/1991 | Culkin . |
| 5,037,562 | 8/1991 | Tarves, Jr. . |
| 5,143,630 | 9/1992 | Rolchigo . |
| 5,178,768 | 1/1993 | White, Jr. . |
| 5,190,659 | 3/1993 | Wang et al. ............................ 210/663 |
| 5,281,344 | 1/1994 | Miller et al. . |
| 5,374,356 | 12/1994 | Miller et al. ............................ 210/641 |

FOREIGN PATENT DOCUMENTS

| | | |
|---|---|---|
| 990873 | 6/1976 | Canada . |
| 0503115 | 3/1991 | European Pat. Off. . |
| 0125360 | 11/1978 | Japan . |
| 2269166 | 2/1994 | United Kingdom . |

OTHER PUBLICATIONS

"V–SEP®. . . A New Standard in Rapid Separations" brochure, New Logic International Inc., (Emeryville, CA).
Culkin, "Vibratory Shear Enhanced Processing: An Answer to Membrane Fouling?," *Chemical Processing* (Jan. 1991).
Culkin et al., "New Separation System Extends The Use of Membranes," *Filtration & Separation*, 29(5) (Sep./Oct. 1992).
Rähse et al., "Mikrofiltration von Fermenterbrühen", *Chemie, Ingenieur. Technik*, 57(9), 747–753 (1985).

*Primary Examiner*—Frank Spear
*Attorney, Agent, or Firm*—Leydig, Voit & Mayer, Ltd.

[57] ABSTRACT

The present invention provides a method of treating wastewater containing particulate matter and free oil, which method comprises removing free oil from the wastewater, passing the wastewater through a first filtration medium having an effective pore rating of about 200 μm or less, subjecting the wastewater to dynamic filtration utilizing a second filtration medium having an effective pore rating of about 5 μm or less, and contacting the wastewater with an adsorbent bed to form a purified water stream. The present invention also provides an apparatus which can be used to carry out the present inventive method.

54 Claims, No Drawings

FLUID TREATMENT PROCESS

CROSS-REFERENCE TO RELATED APPLICATION

This patent application is a continuation of U.S. patent application Ser. No. 08/295,611, filed Aug. 25, 1994, now abandoned, which in turn is a continuation-in-part of U.S. patent application Ser. No. 07/920,973, filed Jul. 28, 1992, now U.S. Pat. No. 5,374,356.

TECHNICAL FIELD OF THE INVENTION

The present invention relates to a fluid treatment process. More particularly, the present invention relates to an improved method for treating wastewater, particularly graywater, to recover purified water and reduce effluents and to an apparatus for effecting such wastewater treatment.

BACKGROUND OF THE INVENTION

The treatment of wastewater to reduce effluents and recycle usable water is a matter of the utmost importance to the overall effort of reducing pollution and conserving water. A particular area of concern is the handling of graywater aboard ships and boats, e.g., marine graywater. Graywater is defined as the combined effluent wastewaters from shipboard galleys, sculleries, dishwashers, laundries, showers, sinks, and wash basins (including deep sinks in work areas such as machine shops and medical areas). The contaminants are typically food particles of up to substantial dimensions (e.g., food slices), animal fats, vegetable oils, soaps, detergents, body oils, human hairs, metallic particles from sculleries and machine shops, solvents, and small articles of clothing (e.g., socks) which may have snaked their way through the laundry system. Graywater is usually differentiated both from blackwater, which is a salt-water-based collection of body wastes and paper materials from shipboard head spaces, and from bilgewater, which is a salt-water-based accumulation of all other shipboard wastewater and which may contain chemical solvents and the like.

Although highly variable in its rate of generation, as well as the concentration and type of contaminants, graywater is generated at an average rate of approximately 5–20 gallons per man per day on board ship. Thus, for example, graywater generation can be on the order of 4,000 gal/day for a naval frigate with a crew of 200 to as high as 120,000 gal/day for an aircraft carrier with a crew of 6,000. Average flow rates of graywater on board such ships can range from about 2.8 gal/min to about 83.3 gal/min, with peak flow rates ranging from about 8.4 gal/min to about 250 gal/min.

Conventional coalescers and centrifugal separators are inadequate to treat and purify graywater, since, for example, the viscosities and surface tensions of soaps and water are too close to permit satisfactory separation. Many ships directly discharge graywater, without treatment, into navigable waters, including lakes and waters near the shoreline. Some ships are equipped with concentration, holding, and transfer tanks for the purpose of storing graywater until it can be pumped to a dockside sanitation system. These ships utilize the concentration, holding, and transfer tanks in an attempt to avoid graywater discharges into lakes and waters near the shoreline, but routinely discharge graywater into the high seas or, when the tanks are filled to capacity, other navigable waters. In those increasingly larger areas where graywater discharge is prohibited, expensive and cumbersome means, such as the off-loading of stored graywater onto tankers, are utilized, or else the prohibitions are merely ignored.

There remains a need, therefore, for an effective and economical means to reduce wastewater effluent, particularly graywater discharges from ships. It is an object of the present invention to provide such a treatment means. It is another object of the present invention to concentrate wastewater contaminants to render them more amenable to storage and disposal while allowing for the discharge of purified water recovered from the wastewater. It is also an object of the present invention to provide a means of treating wastewater, particularly graywater, so as to recycle usable water and thereby conserve water. These and other objects and advantages of the present invention, as well as additional inventive features, will be apparent from the description of the invention provided herein.

BRIEF SUMMARY OF THE INVENTION

The present invention provides a method and apparatus for treating wastewater. The present inventive method and apparatus are particularly well-suited for treating wastewater containing particulate matter and free oil, particularly marine graywater.

The present inventive method for treating wastewater containing particulate matter and free oil comprises removing free oil from the wastewater, passing the wastewater through a first filtration medium having an effective pore rating of about 200 µm or less, subjecting the wastewater to dynamic filtration utilizing a second filtration medium having an effective pore rating of about 5 µm or less, and contacting the wastewater with an adsorbent bed to form a purified water stream.

The present inventive apparatus for treating wastewater containing particulate matter and free oil comprises: (a) means for removing free oil from the wastewater, (b) means for passing the wastewater after removal of the free oil to a first filtration medium, (c) a first filtration medium having an effective pore rating of about 200 µm or less, (d) means for passing the wastewater after passage through the first filtration medium to a dynamic filtration apparatus, (e) a dynamic filtration assembly comprising a second filtration medium having an effective pore rating of about 5 µm or less, (f) means for passing the wastewater after passage through the second filtration medium to an adsorbent bed, and (f) an adsorbent bed.

DESCRIPTION OF THE PREFERRED EMBODIMENTS

The present invention is premised on the discovery that wastewater can be treated to concentrate contaminants in the wastewater and provide a purified water stream by pretreating the wastewater to remove larger particles and free oil, subjecting the wastewater to dynamic filtration utilizing a filtration medium having an effective pore rating of about 5 µm or less, and then contacting the wastewater with a suitable adsorbent bed to remove any remaining contaminants. The purified water stream can then be further treated, recycled, and/or discharged as appropriate, while the concentrate streams can be further processed or held for proper disposal.

While the present invention is particularly well-suited for the treatment of graywater, especially marine graywater, the present inventive method and apparatus may be used to treat other types of wastewater. Other suitable uses of the present invention include the treatment of wastewater from food processing plants, such as breweries, bakeries, dairies, sweet potato starch processing plants, and poultry processing plants, laundries, textile plants, pharmaceutical plants, and the like. The present invention is described herein in the context of the treatment of marine graywater, although it will be understood that it is well within the skill of an ordinary artisan to apply the present invention in other contexts.

Wastewater and Purified Water Characteristics

The function of the present invention as applied to the treatment of marine graywater is to reduce the quantity and/or concentrations of various contaminants to levels below the standards set for receiving waters, i.e., those natural waters into which the graywater may be discharged by a ship. The typical characteristics of graywater and receiving water are set forth below.

| Characteristic | Graywater | Receiving Water |
| --- | --- | --- |
| Total Solids (TS) (mg/l) | 259–11700 | 30–11600 |
| Total Suspended Solids (TSS) (mg/l) | 101–4695 | 30 |
| Biochemical Oxygen Demand (BOD) (mg/l) | 137–2616 | 30 |
| Chemical Oxygen Demand (COD) (mg/l) | 304–7839 | 0–90 |
| Oils & Greases (O&G) (mg/l) | 5–1210 | 0–15 |
| Fecal Coliforms (FC) (#/100 ml) | 0–$10^4$ | 14 |
| pH | 5.7–11.2 | 6.5–8.5 |
| Residual Chlorine (RC) (mg/l) | 0–10 | 0.0002 |
| Dissolved Oxygen (DO) (mg/l) | 0 | ≧5 |

The total solids (TS) is the sum of the total suspended solids (TSS) and total dissolved solids. The total solids is the residue which would remain after evaporation. The biochemical oxygen demand (BOD) represents the quantity of dissolved oxygen required during stabilization of the decomposable organic matter by aerobic biochemical action in the water. The chemical oxygen demand (COD) is a measure of the quantity of oxidizable components present in the water.

Thus, the present invention is particularly well-suited to the treatment of wastewater comprising at least about 150 mg/l total solids, at least about 100 mg/l total suspended solids, at least about 100 mg/l BOD, at least about 200 mg/l COD, and/or at least about 15 mg/l oils and greases. Such wastewater may also contain fecal coliforms, e.g., in a concentration of up to about $10^6$, $10^8$ or more fecal coliforms/100 ml. The wastewater may also contain residual chlorine, e.g., in a concentration of up to about 20 mg/l or more, and may contain less than about 5 mg/l dissolved oxygen, perhaps even substantially no dissolved oxygen. The pH of such wastewater can generally be of any value (depending on the stability of the equipment being utilized), although the present invention functions better with pH's of about 5–12.

The treatment of wastewater in accordance with the present invention involves, in part, the successive separation of smaller particles from the wastewater stream. While such a separation process can be effective in removing suspended particles from the wastewater, it will usually be desirable to pre-treat the wastewater to remove free oil and to post-treat the effluent to remove other contaminants. The preferred embodiment of the present invention incorporates such pre- and post-treatments.

The present invention preferably treats wastewater such that the purified water stream contains less than about 150 mg/l, preferably less than about 30 mg/l, total solids, less than about 100 mg/l, preferably less than about 30 mg/l, total suspended solids, less than about 100 mg/l, preferably less than about 30 mg/l, BOD, less than about 100 mg/l, preferably less than about 90 mg/l, COD, and less than about 15 mg/l oils and greases. The purified water stream also preferably has less than about 14 fecal coliforms/100 ml, less than about 0.0002 mg/l residual chlorine, and at least about 5 mg/l dissolved oxygen. The pH of the purified water stream is preferably about 6–9, more preferably about 6.5–8.5. Most preferably, the purified water stream is suitable for discharge into restricted receiving waters in accordance with U.S. requirements, i.e., the purified water stream contains less than about 30 mg/l total suspended solids, less than about 30 mg/l BOD, less than about 14 fecal coliforms/ 100 ml, less than about 0.0002 mg/l residual chlorine, and at least about 5 mg/l dissolved oxygen, with a pH of about 6.5–8.5.

Pretreatment

The pretreatment of the wastewater prior to subjecting the wastewater to dynamic filtration preferably comprises removing free oil from the wastewater and then passing the wastewater through a first filtration medium. Free oil may be removed from the wastewater by any suitable means, preferably by contacting the wastewater with a material, such as cotton, preferably in the form of Turkish towels, which absorbs free oil. The first filtration medium preferably has an effective pore rating of about 200 μm or less, more preferably about 160 μm or less. The removal of free oil and relatively larger particulates from the wastewater prior to subjecting the wastewater to dynamic filtration is designed to ensure the suitable operation of the subsequent dynamic filtration process and avoid premature fouling of the filtration medium employed in the dynamic filtration apparatus.

To further facilitate the efficient treatment of the wastewater, the wastewater is preferably passed through a strainer prior to passage through the first filtration medium (and also preferably prior to the removal of free oil, although this is not as significant). Any suitable strainer can be so utilized, e.g., a duplex strainer, and the strainer is designed to remove larger particulate matter (such as hair, laundry items, and the like) and, as such, will typically be a perforated plate or, more preferably, a screen mesh. A suitable screen mesh strainer can be of any suitable configuration, but will preferably have about 10–50 wires per linear inch in each direction, with any suitable wire diameter, e.g., about 0.002–0.02 inch. More preferably, such a screen mesh strainer will have about 20–40 wires per linear inch, most preferably about 30 wires per linear inch, in each direction, with any suitable wire diameter, e.g., about 0.002–0.02 inch, preferably about 0.005–0.01 inch. The strainer desirably removes particles greater than at least about 1000 μm, preferably greater than at least about 600 μm, in diameter.

The strainer is preferably sized to reduce the frequency of plugging while removing as much particulate matter as possible, particularly particulate matter which would disrupt the satisfactory operation of the first filtration medium. To permit continuous operation, a duplex switching strainer is preferably used such that, as one strainer becomes plugged, it is taken off-line, and flow is switched to the second strainer. The off-line strainer is then backwashed by any suitable means, e.g., with a relatively small volume of strained wastewater or purified water or by air-pulse means, to clean the strainer for later use. Any effluent can be passed to a suitable concentrate tank for later disposal. The backwashing can be accomplished automatically to avoid the need for operator intervention in this process.

The wastewater is also preferably passed into a holding tank prior to passage through the first filtration medium (and also preferably prior to passage through the strainer, if utilized, and prior to the removal of free oil, although, again, this is not as significant). The holding tank is preferably designed so as to permit high density materials entrained in the wastewater to settle out on the bottom of the holding tank, thereby effecting their separation from the wastewater. For example, the holding tank can contain baffles and/or the holding tank outlet can be set a short distance, e.g., several centimeters, above the bottom of the holding tank to permit the high density materials entrained in the wastewater to settle out on the bottom of the holding tank. In that respect, the bottom of the holding tank can have a removable access cover to facilitate occasional periodic removal of the high density contaminants. The strainer and/or means to effect removal of any free oil may be, and are preferably, contained within the holding tank. In particular, the holding tank preferably contains sloped surfaces such that the wastewater must flow alternately upwards and downwards, which sloped surfaces not only assist in the removal of high density materials from the wastewater but also assist in the separation of any free oil from the wastewater.

In addition to facilitating the removal of high density materials from the wastewater, the holding tank provides some equalization for the incoming wastewater. The volume and contaminant concentration of the wastewater can vary throughout the day in particular end-uses, such as on board ships, and, therefore, subsequent processing will produce more consistent results as the variations in flow rate and concentrations are averaged out or equalized by the holding tank. Such equalization can have a particular effect on possible excursions in the outlet BOD, pH, and other parameters. Moreover, in many end-uses, particularly on board ships, the holding tank is desirably sized to collect and hold a volume equivalent to peak flow for some reasonable period of time, e.g., about an hour to several hours time, to ensure that the treatment system is not overwhelmed during times of excessive wastewater generation (although the holding tank volume may be smaller or larger depending on the specific wastewater generation and treatment system capacity).

At any point in the pretreatment process, desirably prior to passage of the wastewater through the first filtration medium and preferably after passage through a suitable holding tank to remove high density materials, the wastewater can be subjected to any suitable action which reduces the size of particulates in the wastewater, e.g., contact with rotating blades, for the purpose of facilitating the removal of such particulates without unduly adversely affecting subsequent filtration media. The means by which the particulate size is reduced may also be the means by which the wastewater is removed from the holding tank and passed downstream for further processing, e.g., to the strainer and first filtration medium. Thus, for example, the outlet of the holding tank can be connected by way of a suitable fluid pathway to a macerator pump. The macerator pump would draw wastewater out of the holding tank, reduce solid materials to smaller particles, and furnish the pressure to force the wastewater through the remainder of the treatment system. The macerator pump may be positioned outside the holding tank or within the holding tank. If a macerator pump is utilized, it is preferably fitted with an integral inlet screen, which is set into the holding tank, permitting the debris collected on the screen to be backwashed as needed into the bottom of the holding tank for subsequent removal. The inlet screen is preferably sized to reduce the frequency of clean-out while removing all particulates of sufficient size which would otherwise overwhelm the macerator pump.

During the pretreatment process, suitable processing chemicals can be fed into the wastewater, although there will generally be no need to do so. Such chemicals can be added to the wastewater by any suitable means, e.g., by way of chemical feed systems. Such chemical feed systems will preferably comprise a piston pump and an electronic controller such that sensors installed downstream are capable of sending signals to the electronic controllers to automatically regulate the rate of chemical feed. The chemical feed pumps can be connected directly to suitable storage containers or carboys containing the chemicals to be added to the wastewater by any suitable means, e.g., by way of flexible suction hoses. In particular, acid can be added to the wastewater to neutralize it, and coagulant can be added to the wastewater to improve the separation efficiency of the dynamic filtration assembly.

Dynamic Filtration

After the pretreatment of the wastewater, it is subjected to dynamic filtration utilizing a second filtration medium having an effective pore rating of about 5 μm or less. The dynamic filtration process is intended to remove substantially all of the remaining particulate matter in the wastewater, preferably without the need for further filtration, e.g., ultrafiltration.

At this level of filtration in an efficient and practical graywater treatment system on board ship, it has been found that effective filtration can only be accomplished through the use of dynamic filtration. Specifically, the effective pore sizes of the filter media are so small, and the effective area of the filter media are so limited, that both plugging of the filter media pores and the formation of cake layers adjacent to the surface of the filter media present themselves as problems with the use of ordinary barrier-type filter elements.

For graywater treatment, once-through barrier filtration is not as satisfactory as dynamic filtration for a variety of reasons. Some of these reasons are that the volumes and contaminant concentrations are generally too high for the effective use of once-through filters, an effective backflush system would be prohibitively large, and precoating (which is needed to keep compressible or sticky contaminants away from the filter medium) requires the introduction of additional chemicals which must be eventually disposed of with the concentrated waste.

Dynamic filtration is an extension of the cross-flow filtration concept. The operating principle is to maintain a filter medium free from plugging or fouling by repelling particulate matter from the filter element and by disrupting the formation of cake layers adjacent to the filter medium. These results are accomplished by moving the fluid being filtered fast enough relative to the filtration medium to produce high shear rates as well as high lift forces on the particles, such as by use of rotary, oscillating, reciprocating, or vibratory means. The shear at the fluid-filter medium interface is nearly independent of any crossflow fluid velocity, unlike tangential or crossflow filtration techniques (which suffer from other problems such as premature filter plugging due to compound adsorption and large and nonuniform pressure drops associated with high tangential velocities along the filter length, potentially causing backflow through the filtration medium and reducing filtration).

Dynamic filtration offers a number of performance advantages in the context of the present invention. Very high shear rates can be produced in the dynamic filtration assembly so as to provide enhanced lift to repel small particles and/or to allow high permeate flow rates. Increases in permeate flux rate have been observed to be approximately linear with increased shear rate in some systems. This means that the filter area required can be dramatically reduced over other filtration means. Since shear can be delivered uniformly across the system, uniformly high flux rates can be achieved and maintained across the system such that progressive fouling is eliminated and extended filtration times can be realized. Moreover, high concentrations of agglomerated particulates can be achieved for removal from the treated fluid using dynamic filtration.

A dynamic filtration assembly has the ability to handle a wide range of contaminants, to achieve an appreciably high concentration of retained solids, to be operated continuously over extended periods without the need for filter aids and/or backflushing, and to achieve uniformly high filter performance to minimize the overall system size. The dynamic filtration assembly may be of any suitable configuration and will typically include a housing which contains a filter unit comprising one or more filtration media and a means to effect relative movement between the filtration medium and the wastewater. The filtration media of the filter unit and the means to effect relative movement between the fluid being filtered and the filtration medium may have any of a variety of suitable configurations. A variety of suitable motive means can be utilized to carry out such relative motion, such as, for example, rotational, oscillation, reciprocating, or vibratory means.

The dynamic filtration assembly may be of any suitable device. Suitable cylindrical dynamic filtration systems are described in U.S. Pat. Nos. 3,797,662, 4,066,554, 4,093,552, 4,427,552, 4,900,440, and 4,956,102. Suitable rotating disc dynamic filtration systems are described in U.S. Pat. Nos. 3,997,447 and 5,037,562, as well as in U.S. patent application Ser. No. 07/812,123. Suitable oscillating, reciprocating, or vibratory dynamic filtration assemblies are generally described in U.S. Pat. Nos. 4,872,988, 4,952,317, and 5,014,564. Other dynamic filtration devices are discussed in Murkes, "Fundamentals of Crossflow Filtration," *Separation and Purification Methods*, 19(1), 1–29 (1990). In addition, many dynamic filtration assemblies are commercially available. For example, suitable dynamic filtration assemblies include Pall BDF-LAB, ASEA Brown Bovery rotary CROT filter, and New Logic V-SEP. While the desired particulate removal can be achieved by any suitable dynamic filtration assembly, it has been found that the use of vibratory dynamic filtration, such as generally exemplified by the New Logic V-SEP, is particularly well-suited in the context of the present invention.

The dynamic filtration desirably creates shear forces of at least about 20,000 sec$^{-1}$, preferably of at least about 100,000 sec$^{-1}$. Optimal filtration rates will be achieved at high shear rates, and, since shear-damage to the concentrate is not a concern in wastewater treatment, maximum shear is preferred, within practical equipment limitations.

Any suitable filtration medium can be utilized in the dynamic filtration assembly. Generally, filtration media with finer effective pore ratings are preferred so as to minimize or avoid the need for post-treatment of the wastewater. Thus, while the filtration medium has an effective pore rating of about 5 µm or less, the filtration medium preferably has an effective pore rating of about 1 µm or less, more preferably about 0.5 µm or less. The dynamic filtration medium most preferably has a molecular weight cut-off of about 200 Daltons or less, and, especially desirable, is a dynamic filtration medium which is a reverse osmosis membrane capable of at least 97% salt rejection (which is believed to be equivalent to a membrane having a molecular weight cut-off of about 50 Daltons). The reverse osmosis membrane capable of at least 97% salt rejection is the finest pore rated membrane which is of practical usefulness in the context of the present invention. After passage of the wastewater through the dynamic filtration assembly, the wastewater desirably need not be subjected to further filtration by passage through a filtration medium, but rather can be subjected merely to an adsorbent bed (and possibly other post-filtration treatments such as ozonation and UV exposure) to remove any remaining contaminants.

The dynamic filtration assembly is connected by way of a suitable fluid pathway to a suitable concentrate tank. The concentrated contaminants from the dynamic filtration assembly are preferably periodically discharged into the concentrate tank. Any suitable means can be employed to control the dynamic filtration assembly, such as a suitable feedback means. It is preferred that feedback controls be employed in connection with the motor mechanism of the dynamic filtration assembly to sense the increased torque requirements associated with the increased viscosity of the concentrated contaminants and to actuate control valves to automatically discharge the concentrated contaminants into the concentrate tank. In treating wastewater, the dynamic filtration assembly will remove much of the particulate load. Specifically, the dynamic filtration assembly will remove the vast majority of the total suspended solids and will reduce the portion of the BOD and COD associated with particulates. The dynamic filtration assembly also preferably removes undesirable molecules and agglomerates, for example, those with molecular weights of at least about 500 Daltons (up to about 30,000 Daltons or more), more preferably those with molecular weights of at least about 200 Daltons, and most preferably those with molecular weights of at least about 50 Daltons. In treating wastewater, the dynamic filtration assembly preferably removes many smaller organic compounds, particularly those bound up in soap micelles, which has the effect of reducing BOD and lowering pH to the extent high pH is caused by soap solutions. The dynamic filtration assembly also preferably has the effect of nearly eliminating total suspended solids and fecal coliforms.

While the concentrate from the dynamic filtration assembly is ultimately passed by way of a suitable fluid pathway into a suitable concentrate tank, this can be accomplished after the concentrate is recycled for further concentration. Since the dynamic filtration process is improved by higher fluid velocities which tend to reduce the filter medium fouling rate, it is preferred that the dynamic filtration assembly utilize a recirculation pump to take suction from the outlet end of the dynamic filtration assembly and discharge it into the inlet end of the dynamic filtration assembly. Recirculation rates of between one and ten times the outlet flow rate are preferred, with higher recirculation flow rates being most preferred in treating heavily contaminated fluids. Two or more dynamic filtration assemblies can be manifolded in a multiplex system to provide for switch-over to a fresh dynamic filtration assembly when one becomes fouled.

Post-treatment

The filtrate from the dynamic filtration assembly may be essentially sterilized water depending on the precise nature and quantity of the wastewater contaminants and the particular pore rating of the dynamic filtration assembly. The dynamic filtration assembly can remove bacteria, yeast, fungi, and the like from the wastewater, and can reduce, if not remove, endotoxins from the wastewater. While the filtrate from the dynamic filtration assembly need not necessarily undergo further processing, the filtrate is preferably further treated to reduce, and preferably remove, any residual microorganisms, viruses, and organic and inorganic compounds. Thus, after the wastewater is subjected to dynamic filtration, the wastewater is contacted with a suitable adsorbent bed to remove any such remaining possible contaminants in the wastewater, particularly organic and inorganic contaminants, such as chlorine and metal ions (especially arsenic which is used on board ship as a rat poison and may find its way into marine graywater), as well as certain microbial contaminants, which may have passed through the dynamic filtration medium.

The adsorbent bed can comprise any suitable adsorbent material(s) and will typically comprise one or more components selected from the group consisting of carbonous sorbent, activated alumina, silica hydrogel, zeolite, and metallic components that generate metallic cations. The carbonous sorbent can be coal base, fruit shells such as coconut shell, wood base, petroleum base activated carbons, synthetic carbons, and mixtures thereof. The carbonous sorbent is most preferably activated carbon. The metallic components that generate metallic cations are preferably selected from the group consisting of copper, zinc, brass, manganese, silver, and mixtures thereof, and most preferably are brass particles.

Since the precise nature of the wastewater may be unknown and may vary from day-to-day, the adsorbent bed preferably is a mixed adsorbent bed containing a variety of adsorbent materials capable of handling a variety of potential contaminants. Such a preferred mixed adsorbent bed can contain, for example, about 40–80 wt. % carbonous sorbent, about 5–20 wt. % activated alumina, about 5–20 wt. % silica hydrogel, about 5–20 wt. % zeolite, and about 0–10 wt. % metallic components that generate metallic cations. The adsorbent bed most preferably comprises activated carbon, activated alumina, silica hydrogel, zeolite, and brass particles. Preferred adsorbent beds are described in, for example, U.S. Pat. No. 5,178,768 and U.S. patent application Ser. No. 08/118,998. After the adsorbent bed becomes loaded with contaminants such that its ability to remove further contaminants is adversely affected, the adsorbent bed can be replaced or, more preferably, regenerated and reused. The adsorbent bed can be regenerated using any suitable means, e.g., with about 200° F. water in accordance with the process described in U.S. Pat. No. 5,281,344.

While the filtrate from the dynamic filtration assembly is preferably passed by way of a suitable fluid pathway directly to the adsorbent bed, the filtrate from the dynamic filtration assembly can be passed through a suitable fluid pathway to an ozonation system prior to contacting the wastewater with the adsorbent bed. The ozonation system generates ozone to polish the filtered wastewater inasmuch as ozone is capable of sterilizing wastewater and oxidizing many organic compounds, as well as killing microorganisms and viruses that may have escaped the upstream filters. Such a sanitizing action typically can be effected with an ozone concentration of at least about 0.5 mg/l, preferably at least about 1 mg/l, in the water. The ozone produces no adverse side effects and quickly disappears from the processed water. Ozone can be supplied by any suitable means.

The ozonation system preferably comprises a pressure swing adsorption air dryer, an ozone generator, an ozone contactor, and, most preferably, a UV lamp and another ozone contactor. The ozone generator can be any suitable device, e.g., a conventional device which produces ozone by accelerating electrons between two electrodes. The feed for the ozone generator is either dry filtered air or oxygen. An oxygen feed produces more ozone and at a higher concentration. Concentrations typically range from 1–8 wt. %, with 2 wt. % being typical of air feed, and 3 wt. % being typical for oxygen feed.

In the case of air feed, compressed air is dried by a dual bed, pressure swing adsorption air dryer. Along with appropriate filters, this unit provides air of the required quality by treating air, preferably compressed air, which passes through a suitable inlet to the pressure swing adsorption air dryer. In the case of oxygen feed, the oxygen in compressed air is concentrated by a purge sweep adsorber. Such a system is similar to that for the pressure swing adsorption air dryer except for the adsorbent and cycle details. Use of an oxygen feed system requires much more air and a larger adsorption system, and, therefore, the air feed system is preferred. The pressure swing adsorption air dryer is used to purify and dry the air to a low dew point, e.g., −70° F. dew point, so that the ozone generator receives filtered, very dry air to perform well and produce high concentrations of ozone over long periods.

The ozone contactor provides contact time for the reaction of organic residue in the filtered wastewater with the ozone generated by the ozone generator. Ozone is generated in the gas phase and must be dissolved in the filtered wastewater. Many methods of transfer or contact are available to accomplish the dissolution of the ozone in the wastewater. For example, the ozone can be bubbled through a column of wastewater with or without packing material. The ozone can be also injected into a pipe carrying the wastewater. The transfer of the ozone into the wastewater is improved by use of an in-line motionless mixer.

The wastewater treatment system preferably also includes a second ozone contactor with a UV light source. Ultraviolet light, particularly of 254 nm, will produce hydroxyl radicals in the ozonated water, which radicals will work with the ozone in oxidizing most organic compounds. The second ozone contactor with UV light source ensures that any desirable or necessary oxidation by ozone in the wastewater is complete.

Residual ozone can be left to naturally decompose to oxygen, since its half-life is about 20 minutes in water at 70° F. Decomposition of the ozone can be accelerated by heating. An alternative method, which has other benefits as discussed above, is the use of UV light irradiation. An adsorbent bed can be also used to remove ozone, particularly since the surface of the adsorbent bed can provide a site for the decomposition of ozone. Thus, to the extent the wastewater is contacted with ozone, such contact preferably occurs prior to the contacting of the wastewater with the adsorbent bed. An ozone analyzer can be used to analyze the processed wastewater or the vent gas to check for the complete removal of ozone from the water. The processed wastewater is then passed from the treatment system through a suitable outlet as a purified water stream.

The concentrate tank can be designed to hold the concentrate generated throughout the treatment process for disposal at a later, convenient point in time. For example, with respect to marine graywater generated on board ship, the concentrate can be pumped out when the ship is at dock with shore facilities or barge facilities at hand or at sea outside of restricted waters.

The processed wastewater can be further treated, recycled, and/or discharged as appropriate. The treatment system is preferably designed to purify graywater to such an extent that it can be discharged into otherwise restricted receiving waters.

The efficiency of the treatment system is such that it can have a footprint no larger than about 20 ft. in length×10 ft. in width×10 ft. in height and still be capable of processing up to five gallons of graywater per minute shipboard, with minimal maintenance.

Apparatus

Any suitable apparatus can be utilized to carry out the present inventive method. Generally, such an apparatus for treating wastewater containing particulate matter and free oil will comprise (a) means for removing free oil from the wastewater, (b) means for passing the wastewater after removal of the free oil to a first filtration medium, (c) a first filtration medium having an effective pore rating of about 200 μm or less, (d) means for passing the wastewater after passage through the first filtration medium to a dynamic filtration apparatus, (e) a dynamic filtration assembly comprising a second filtration medium having an effective pore rating of about 5 μm or less, (f) means for passing the wastewater after passage through the second filtration medium to an adsorbent bed, and (g) an adsorbent bed.

The apparatus will preferably further comprise a strainer through which the wastewater is passed prior to passage through the first filtration medium. Such a strainer will preferably be a screen mesh, as described above in the context of the present inventive method. The first filtration medium preferably has an effective pore rating of about 160 μm or less, and the means for removing free oil preferably comprises means for contacting the wastewater with a material which absorbs free oil, such as cotton (e.g., Turkish towels).

As explained in more detail with respect to the present inventive method, the dynamic filtration assembly is preferably capable of creating shear forces of at least about 20,000 sec$^{-1}$, more preferably shear forces of at least about 100,000 sec$^{-1}$. The dynamic filtration assembly is most preferably a vibratory dynamic filtration assembly. The second filtration medium preferably has a molecular weight cut-off of about 200 Daltons or less and more preferably is a reverse osmosis membrane capable of at least 97% salt rejection.

As also explained above in more detail with respect to the present inventive method, the adsorbent bed can contain any suitable adsorbent materials designed to remove contaminants which could conceivably pass through the dynamic filtration medium. The adsorbent bed preferably comprises carbonous sorbent (particularly activated carbon), activated alumina, silica hydrogel, zeolite, and metallic components that generate metallic cations (such as copper, zinc, brass, manganese, silver, and mixtures thereof, particularly brass particles).

The apparatus can further comprise an ozone contactor for contacting the wastewater with ozone prior to contact with the adsorbent bed (which can be used to remove residual ozone and/or facilitate its decomposition, as well as remove any ozone reaction products). The apparatus can further comprise an ultraviolet light irradiation source for subjecting the ozonated wastewater to ultraviolet light irradiation, preferably prior to contact of the wastewater with the adsorbent bed.

In most applications, as described above with respect to the present inventive method, the apparatus will further comprise a holding tank which enables high density material entrained in the wastewater to settle out on the bottom of the holding tank prior to passage of the wastewater through the strainer. The apparatus can also comprise means for reducing the size of particulates in the wastewater prior to passing the wastewater through the first filtration medium. The apparatus will typically further comprise suitable valves (to control the flow of the wastewater), vents (such as a carbon vent filter to deodorize gases vented from the wastewater holding tank and concentrate tank), and the like as are known in the art.

EXAMPLES

The following examples further illustrate the present invention, particularly the use of dynamic filtration to treat fluids. These examples, of course, should not be considered as in any way limiting the scope of the present invention.

Example 1

Two 55-gallon drums of graywater were drawn from the David Taylor Research Center and the nearby Naval Academy. The origin of the graywater was believed to be 45% from showers and wash basins, 33% from galley and scullery, and 22% from the laundry. Testing was completed within 72 hours of when the sample was drawn.

The sample, as received, did not appear to include any large particles. Fifty-five gallons of the graywater was drawn though a stainless steel 24×24 —0.014×0.014 mesh screen. A household garbage disposal was used to further reduce the size of any large particles. Approximately fifteen gallons of the strained water was filtered using a BDF-LAB Dynamic Microfilter (Pall Corporation). The filter medium was a balanced cylinder of Pall S050-3 PSS grade H, S-series porous stainless steel, with a 5 μm absolute rating.

Half the outlet flow was concentrate, and half the outlet flow was filtrate. The filter was started using clear water to set operating parameters. The inlet was then switched to graywater, and the operating parameters were adjusted as appropriate. Flow rates were maintained constant through the test by slightly increasing the operating pressure during the course of the test. Although the filter was tested for only a short time, it was evident that the filter did not foul as quickly as a standard filter. Apparent turbidity in the filtrate was significantly lower than that of the influent, while turbidity of the concentrate was higher than that of the influent. The permeate flow rates and annulus pressures at 10 and 30 minutes into the test are set forth below.

| Time (min) | Filtrate Flow (gpm) | Annulus Pressure (psig) |
| --- | --- | --- |
| 10 | 0.091 | 6.8 |
| 30 | 0.110 | 7.5 |

About two gallons of filtrate were ozonated for 200 minutes. The ozonator used a recirculation loop with 30 feet of copper tubing. A Clean Air Corporation ozone generator, producing 8 g/hr of ozone, was used to supply ozone. An aspirator was used to introduce ozone. Turbulence at 6–8 ft/min provided the contact and mixing of the ozonated air and water.

The characteristics of the graywater at various stages of the treatment are set forth below.

|  | strained | filtered | ozone (1 min) | ozone (3 min) | ozone (10 min) | ozone (30 min) | ozone (100 min) | ozone (200 min) |
|---|---|---|---|---|---|---|---|---|
| TS (mg/l) | 1900 | | | | | | | 1700 |
| TSS (mg/l) | 26 | | | | | | | 6 |
| BOD (mg/l) | 170 | 120 | 100 | 130 | 140 | 130 | 110 | 150 |
| COD (mg/l) | 560 | 490 | 450 | 460 | 450 | 420 | 430 | 360 |
| O&G (mg/l) | <1 | | | | | | | <1 |
| FC (#/100 ml) | 1 | | | | | | | 1 |
| pH | 10.3 | | | | | | | 10.3 |
| RC (mg/l) | <0.1 | | | | | | | <0.1 |

While the total suspended solids (TSS) was not measured after filtration, it is believed that dynamic filtration was solely responsible for effecting the reduction in TSS from 26 mg/l to 6 mg/l. The increase in BOD from the filtered water through ozonation was believed to be the result of ozonation converting nonbiodegradable material into biodegradable material. After 200 minutes of ozonation, the water remained foamy, indicating that soaps were not broken down. The pH remained unaffected by the dynamic filtration and the ozonation.

It was clear from the test that ozone was effective in reducing the COD of graywater. Although only a small amount of ozone was applied, there was an appreciable reduction in COD. Ozone was added in a concentration of 72 ppm for 200 minutes. During that time, samples were drawn from the reservoir, reducing the total volume of graywater and increasing the concentration of ozone with each new time period. At the end of the time, the concentration of ozone would have been 43 mg/l, if no ozone had been consumed through reaction. If all of the applied ozone had reacted with COD compounds, the COD should have been reduced by 43 mg/l. The COD level, however, was reduced from 490 mg/l to 360 mg/l, a decrease of 130 mg/l. This decrease is three times more than the reduction in COD that could be attributed to the action of ozone alone.

The ozone was transferred to the water by an air stream. There was almost 3000 times more oxygen than ozone in the air. The oxygen would be effective in oxidizing those compounds that are easily oxidized, and the air flowing through the water could also strip out volatile organic compounds. These mechanisms may account for the added effectiveness of the ozonation process.

Although ozone proved effective for reducing COD, and perhaps BOD, it is clear that a significant quantity of ozone would be needed to reduce COD and BOD to acceptable levels after only dynamic filtration utilizing a filtration medium having a pore rating of 5 µm. While this test demonstrated the feasibility of dynamic filtration and ozonation in the treatment of graywater, this test also demonstrated the desirability of dynamic filtration utilizing a filtration medium having a pore rating of less than about 5 µm.

Example 2

A fifty-five gallon drum of graywater was drawn from the David Taylor Research Center and filtered through a series of filters characterized by decreasing pore size. The first filter was a knit mesh screen which simulated a strainer. The second, third, and fourth filters simulated the filtration of the dynamic filtration assembly. The second filter was an Ultipor® GF 3 µm absolute filter (Pall Corporation), while the third filter was a Sanitary Filter with a nylon membrane and a 0.04 µm absolute rating (Pall Corporation), and the fourth filter was an Ultrafilter® model VIP-3017 (Asahi), with a cut-off molecular weight of 6000 Daltons.

The fourth filter was rinsed with 3 µm absolute deionized water for approximately 20 hours and then drained prior to testing. The drum of graywater was pressurized to approximately 5 psig with air, which forced the graywater through the filters at a total flow rate of less than 0.5 gpm. The concentrate flow rate from the fourth filter was approximately one-fourth that of the filtrate (purified water) flow rate. Samples of the filtrate were taken at three different locations on the test system: (i) downstream of the first filter, (ii) downstream of the second and third filters, and (iii) downstream from the fourth filter. The filtrate was allowed to flow from the first two sample taps for 30 seconds before the samples were taken, and the fourth filter was flushed with process fluid for ten minutes prior to collecting samples.

The filtration system definitely improved the clarity of the graywater, and the odor and foaming of the graywater were also reduced. The flow rate gradually dropped through the test while a constant pressure was maintained in the drum. Examination of the system indicated that either the second or third filter, or both, were becoming plugged. The use of an actual dynamic filtration assembly will preclude such plugging. Examination of the concentrate in the housing of the second filter revealed that it was much darker than the original graywater fluid. The test results are set forth below.

|  | first filter | second + third filters | fourth filter |
|---|---|---|---|
| TS (mg/l) | 1100 | 980 | 580 |
| TSS (mg/l) | 26 | 2 | 1 |
| BOD (mg/l) | 220 | 74 | 47 |
| COD (mg/l) | 540 | 210 | 120 |
| O&G (mg/l) | 110 | 9 | 1 |
| FC (#/100 ml) | 19 | <1 | <1 |
| pH | 10.1 | 10.1 | 9.9 |

The test results indicate that the combination of the various filters can meet total suspended solids and fecal coliform requirements, while the addition of acid feed may be required to correct the strongly alkaline condition. The use of a coagulant upstream would enhance the filtration effect achieved by the dynamic filtration. The test results also indicate that ozone and UV light irradiation would be useful to further reduce the BOD level.

Example 3

Two 55-gallon drums of graywater were obtained from the U.S. Naval Academy at Annapolis, Md. Each drum of graywater contained 27 gallons laundry water, 18 gallons galley water, and 5 gallons shower water.

Using a barrel pump, the graywater was passed through a 30×30×0.0065 screen (wires/linear inch×wires/linear inch× wire diameter (inches)) into pails to remove large debris. The removed debris consisted of hairs, thick stringy material, flakes, and other soft media. The bottom 2–3 inches of each graywater drum contained a thick, black oily substance.

The graywater in the pails was then poured through a 160 μm metal screen filter. The thus filtered graywater was opaque, ink black and contained no trace of soap or soap suds. A strong, pungent odor was emitted by the freshly poured graywater, but subsided within a few hours.

The graywater was then subjected to dynamic filtration utilizing the vibratory dynamic filtration assembly PALL-SEP VMF Series L (Pall Corporation) and one of two filtration media, either a 200 molecular weight cutoff nanofiltration membrane (with a 80% minimum salt rejection rating) or a 97% salt rejection rated reverse osmosis membrane. The operating conditions of the dynamic filtration assembly were as follows:

|  | Nanofiltration Membrane | Reverse Osmosis Membrane |
|---|---|---|
| graywater feed pressure | 200 psig ± 5 psig | 200 psig ± 1 psig |
| graywater feed temperature | 72° F. ± 1° F. | 72° F. ± 0.3° F. |
| graywater return flow rate | 0.40 gpm ± 0.01 gpm | 0.40 gpm ± 0.03 gpm |
| PALL-SEP VMF oscillatory displacement | 1.25 in | 1.25 in |
| PALL-SEP VMF oscillatory frequency | 63.25 cps ± 0.10 cps | 63.25 cps ± 0.05 cps |

Utilizing the nanofiltration membrane, approximately 80 gallons of graywater were treated over a three-week period. At the end of this period, 99.31% of the fluid had been removed from the system as permeate. The total permeate collected, i.e., 287.53 l, indicated a loss of 13.3 l or 3.52 gal of graywater. The loss in graywater was attributed to the evaporation of volatile organic compounds which were noticeably emitted and water vapor. The total graywater quantities recorded were reduced by 4.4% to account for the evaporative loss. As the % permeate/total graywater progressed toward 99.31%, the permeate flowrate decreased from about 73 ml/min to about 47 ml/min.

Utilizing the reverse osmosis membrane, approximately 72 l of graywater were treated with a permeate recovery of about 68 l, or about 94.31%. As the % permeate/total graywater progressed from about 89% to about 94%, the permeate flowrate decreased from about 24.4 ml/min to about 21.3 ml/min.

The characteristics of the graywater before and after being subjected to the dynamic filtration are set forth below:

|  | Graywater Before Dynamic Filtration | Graywater After Dynamic Filtration (Nanofiltration Membrane) | Graywater After Dynamic Filtration (Reverse Osmosis Membrane) |
|---|---|---|---|
| Total Solids (mg/l) | 14,600 | {683} | [15] |
| Total Suspended Solids (mg/l) | 85.8 | [1.5] | [2] |
| Biochemical Oxygen Demand (mg/l) | ND (<60) | [11] | [8.8] |
| Chemical Oxygen Demand (mg/l) | 111 | 40.2 | ND (<2) |
| Oils & Greases (mg/l) | 33.1 | 1.7 | 2.7 |
| Fecal Coliforms (#/100 ml) | ND (<4) | NT | NT |
| pH | 8.55 | 8.41 | 6.56 |

ND: none detected
NT: not tested
[ ]: probably background level - samples collected in nonsterilized plastic containers
{ }: dubious result (actual value likely lower)

The permeate derived from the nanofiltration membrane exhibited a mild, pungent odor and had a very slight yellow tint. The permeate derived from the reverse osmosis membrane was crystal clear and did not emit any odor. Both permeates met U.S. requirements for discharge into open water; however, the permeate derived from the reverse osmosis membrane was generally more free of contaminants than the permeate derived from the nanofiltration membrane. The permeate derived from the nanofiltration membrane would preferably be further processed by contacting the permeate with a suitable adsorbent bed to ensure compliance with applicable discharge laws, while the permeate derived from the reverse osmosis membrane could possibly avoid the need for such further treatment.

All of the references cited herein, including patents, patent applications, publications, and the like, are hereby incorporated in their entirety by reference.

While this invention has been described with an emphasis upon preferred embodiments, it will be obvious to those of ordinary skill in the art that variations in the preferred method and apparatus may be used and that it is intended that the invention may be practiced otherwise than as specifically described herein. Accordingly, this invention includes all modifications encompassed within the spirit and scope of the invention as defined by the following claims.

What is claimed is:

1. A method of treating wastewater containing particulate matter and free oil, which method comprises removing free oil from said wastewater, passing said wastewater through a first filtration medium having an effective pore rating of about 200 μm or less, subjecting said wastewater to dynamic filtration utilizing a second filtration medium having an effective pore rating of about 5 μm or less, and contacting said wastewater with an adsorbent bed to form a purified water stream, wherein said wastewater is not subjected to ultrafiltration after being subjected to said dynamic filtration.

2. The method of claim 1, wherein said wastewater is passed through a strainer prior to passing said wastewater through said first filtration medium.

3. The method of claim 2, wherein said strainer is a screen mesh comprising about 10–50 wires per linear inch in each direction with such wires having a diameter of about 0.002–0.02 inch.

4. The method of claim 2, wherein said first filtration medium has an effective pore rating of about 160 μm or less.

5. The method of claim 4, wherein free oil is removed from said wastewater by contacting said wastewater with a material which absorbs free oil.

6. The method of claim 5, wherein said material which absorbs free oil is cotton.

7. The method of claim 5, wherein said dynamic filtration creates shear forces of at least about 20,000 sec$^{-1}$.

8. The method of claim 5, wherein said dynamic filtration creates shear forces of at least about 100,000 sec$^{-1}$.

9. The method of claim 8, wherein said dynamic filtration is vibratory dynamic filtration.

10. The method of claim 9, wherein said second filtration medium has a molecular weight cut-off of about 200 Daltons or less.

11. The method of claim 9, wherein said second filtration medium is a reverse osmosis membrane capable of at least 97% salt rejection.

12. The method of claim 11, wherein said adsorbent bed comprises one or more components selected from the group consisting of carbonous sorbent, activated alumina, silica hydrogel, zeolite, and metallic components that generate metallic cations.

13. The method of claim 12, wherein said metallic components that generate metallic cations are selected from the group consisting of copper, zinc, brass, manganese, silver, and mixtures thereof.

14. The method of claim 13, wherein said adsorbent bed comprises activated carbon, activated alumina, silica hydrogel, zeolite, and brass particles.

15. The method of claim 12, wherein said wastewater is passed into a holding tank prior to passing said wastewater through said strainer.

16. The method of claim 15, wherein said holding tank permits high density material entrained in said wastewater to settle out on the bottom of said holding tank.

17. The method of claim 16, wherein said wastewater is subjected to action which reduces the size of particulates in said wastewater prior to passing said wastewater through said first filtration medium.

18. The method of claim 17, wherein said wastewater is contacted with ozone prior to contacting said wastewater with said adsorbent bed.

19. The method of claim 18, wherein the concentration of said ozone in said purified water stream is at least about 0.5 mg/l.

20. The method of claim 18, wherein said wastewater is subjected to ultraviolet light irradiation.

21. The method of claim 11, wherein said wastewater is marine graywater.

22. The method of claim 21, wherein said wastewater comprises at least about 150 mg/l total solids, at least about 100 mg/l total suspended solids, at least about 100 mg/l BOD, at least about 200 mg/l COD, and/or at least about 15 mg/l oils and greases.

23. The method of claim 22, wherein said wastewater further comprises fecal coliforms.

24. The method of claim 23, wherein said fecal coliforms are present in a concentration of up to about $10^6$ fecal coliforms/100 ml.

25. The method of claim 23, wherein said wastewater further comprises residual chlorine.

26. The method of claim 25, wherein said residual chlorine is present in a concentration of up to about 20 mg/l.

27. The method of claim 26, wherein said wastewater contains less than about 5 mg/l dissolved oxygen.

28. The method of claim 27, wherein said wastewater contains substantially no dissolved oxygen.

29. The method of claim 28, wherein said wastewater has a pH of about 5–12.

30. The method of claim 22, wherein said purified water stream has less than about 150 mg/l total solids, less than about 100 mg/l total suspended solids, less than about 100 mg/l BOD, less than about 200 mg/l COD, and less than about 15 mg/l oils and greases.

31. The method of claim 30, wherein said purified water stream comprises less than about 14 fecal coliforms/100 ml.

32. The method of claim 31, wherein said purified water stream comprises less than about 0.0002 mg/l residual chlorine.

33. The method of claim 32, wherein said purified water stream comprises at least about 5 mg/l dissolved oxygen.

34. The method of claim 33, wherein said purified water stream has a pH of about 6.5 to about 8.5.

35. An apparatus for treating wastewater containing particulate matter and free oil comprising:

(a) means for removing free oil from said wastewater, (b) means for passing said wastewater after removal of said free oil to a first filtration medium, (c) a first filtration medium having an effective pore rating of about 200 μm or less, (d) means for passing said wastewater after passage through said first filtration medium to a dynamic filtration apparatus, (e) a dynamic filtration assembly comprising a second filtration medium having an effective pore rating of about 5 μm or less, (f) means for passing said wastewater after passage through said second filtration medium to an adsorbent bed, and (g) an adsorbent bed, wherein said apparatus does not contain an ultrafiltration assembly downstream of said dynamic filtration assembly.

36. The apparatus of claim 35, wherein said apparatus further comprises a strainer through which said wastewater is passed prior to passage through said first filtration medium.

37. The apparatus of claim 36, wherein said strainer is a screen mesh comprising about 10–50 wires per linear inch in each direction with such wires having a diameter of about 0.002–0.02 inch.

38. The apparatus of claim 36, wherein said first filtration medium has an effective pore rating of about 160 μm or less.

39. The apparatus of claim 38, wherein means for removing free oil comprises means for contacting said wastewater with a material which absorbs free oil.

40. The apparatus of claim 39, wherein said material which absorbs free oil is cotton.

41. The apparatus of claim 39, wherein said dynamic filtration assembly is capable of creating shear forces of at least about 20,000 sec$^{-1}$.

42. The apparatus of claim 39, wherein said dynamic filtration assembly is capable of creating shear forces of at least about 100,000 sec$^{-1}$.

43. The apparatus of claim 42, wherein said dynamic filtration assembly is a vibratory dynamic filtration assembly.

44. The apparatus of claim 43, wherein said second filtration medium has a molecular weight cut-off of about 200 Daltons or less.

45. The apparatus of claim 44, wherein said second filtration medium is a reverse osmosis membrane capable of at least 97% salt rejection.

46. The apparatus of claim 45, wherein said adsorbent bed comprises one or more components selected from the group consisting of carbonous sorbent, activated alumina, silica hydrogel, zeolite, and metallic components that generate metallic cations.

47. The apparatus of claim 46, wherein said metallic components that generate metallic cations are selected from the group consisting of copper, zinc, brass, manganese, silver, and mixtures thereof.

48. The apparatus of claim 47, wherein said adsorbent bed comprises activated carbon, activated alumina, silica hydrogel, zeolite, and brass particles.

49. The apparatus of claim 45, wherein said apparatus further comprises an ozone contactor for contacting said wastewater with ozone prior to contact with said adsorbint bed.

50. The apparatus of claim 49, wherein said apparatus further comprises an ultraviolet light irradiation source for subjecting ozonated wastewater to ultraviolet light irradiation.

51. The apparatus of claim 44, wherein said apparatus further comprises a holding tank which enables high density material entrained in said wastewater to settle out on the bottom of said holding tank prior to passage of said wastewater through said strainer.

52. The apparatus of claim 51, wherein said apparatus further comprises means for reducing the size of particulates in said wastewater prior to passing said wastewater through said first filtration medium.

53. The method of claim 1, wherein said wastewater is not subjected to further filtration after said wastewater is subjected to said dynamic filtration.

54. The apparatus of claim 35, wherein said apparatus does not contain any filtration device downstream of said dynamic filtration assembly.

* * * * *